United States Patent [19]

Merkel

[11] Patent Number: 6,087,281
[45] Date of Patent: *Jul. 11, 2000

[54] LOW CTE CORDIERITE BODIES WITH NARROW PORE SIZE DISTRIBUTION AND METHOD OF MAKING SAME

[75] Inventor: Gregory A. Merkel, Big Flats, N.Y.

[73] Assignee: Corning Incorporated, Corning, N.Y.

[ * ] Notice: This patent is subject to a terminal disclaimer.

[21] Appl. No.: 09/348,307

[22] Filed: Jul. 7, 1999

Related U.S. Application Data

[63] Continuation-in-part of application No. 09/252,519, Feb. 18, 1999.
[60] Provisional application No. 60/075,846, Feb. 25, 1998.
[51] Int. Cl.[7] .................................................. C04B 35/195
[52] U.S. Cl. ................................ 501/9; 501/118; 501/119
[58] Field of Search ................................ 501/9, 118, 119, 501/153

[56] References Cited

U.S. PATENT DOCUMENTS

| | | |
|---|---|---|
| 4,421,699 | 12/1983 | Inoguchi et al. . |
| 4,772,580 | 9/1988 | Hamanaka et al. . |
| 4,849,275 | 7/1989 | Hamaguchi et al. . |
| 4,869,944 | 9/1989 | Harada et al. . |
| 4,877,670 | 10/1989 | Hamanaka et al. . |
| 5,114,644 | 5/1992 | Beall et al. . |
| 5,262,102 | 11/1993 | Wada . |
| 5,552,349 | 9/1996 | Ichii et al. .................................. 501/9 |
| 5,607,885 | 3/1997 | Ichi et al. . |

*Primary Examiner*—Paul Marcantoni
*Attorney, Agent, or Firm*—L. Rita Herzfeld

[57] ABSTRACT

Cordierite body of CTE at 25–800° C. of $\leq 4 \times 10^{-7}$C, at least 85% of porosity having pore diameter of 0.5–5.0$\mu$; or $>4$–$6 \times 10^{-7}$C$^{-1}$, porosity at least 30 vol %, at least 85% of porosity has pore diameter 0.5–5.0$\mu$. Raw materials talc, $Al_2O_3$ source, and kaolin, calcined kaolin, and/or silica, and optionally spinel, particle diameter of talc $\leq 3.0\mu$, of $Al_2O_3$ source $<2.0\mu$, kaolin is $<35$ wt % of raw materials when particle diameter is $<2.0\mu$, are blended with vehicle and aids into plastic mixture. Green body is formed, dried, fired at 1370° C.–1435° C. When particle diameter of talc is $<2.0\mu$, and $Al_2O_3$ source is $<20$ wt % of raw materials, and dispersible high surface area $Al_2O_3$ source having particle diameter of $<0.3\mu$, is $<5.0$ wt % of raw materials, and particle diameter of kaolin is $<2.0\mu$, heating rate from 1150° C.–1275° C. is $>200°$ C./hr. When particle diameter of talc is $\geq 2.0\mu$, and $Al_2O_3$ source is $<20$ wt % of raw materials, and dispersible high surface area $Al_2O_3$ source having particle diameter of $<0.3\mu$, is $<5.0$ wt % of raw materials, and particle diameter of kaolin is $<2.0\mu$, heating rate from 1150° C.–1275° C. is $>50°$ C./hr and $<600°$ C./hr. When $Al_2O_3$ source is less than 20 wt % of raw materials, and dispersible $Al_2O_3$ source having particle diameter $<0.3\mu$ is $\geq 5.0$ wt % of raw materials, and particle diameter of kaolin is $<2.0\mu$, heating rate from 1150° C.–1275° C. is $>50°$ C./hr. When particle diameter of kaolin is $>2.0\mu$, heating rate from 1150° C.–1275° C. is $<600°$ C./hr and $>30°$ C./hr.

7 Claims, No Drawings

LOW CTE CORDIERITE BODIES WITH NARROW PORE SIZE DISTRIBUTION AND METHOD OF MAKING SAME

This application is a continuation-in-part of application Ser. No. 09/252,519, filed Feb. 18, 1999, which claims the benefit of U.S. Provisional Application Ser. No. 60/075,846, filed Feb. 25, 1998, entitled "LOW CTE CORDIERITE BODIES WITH NARROW PORE SIZE DISTRIBUTION AND METHOD OF MAKING SAME", by Gregory A. Merkel.

This invention relates to cordierite bodies having a unique combination of low coefficient of thermal expansion (CTE) and narrow pore size distribution. This is accomplished by use of selected combinations of raw materials and firing schedules. More particularly, the bodies are honeycomb structures that find use as substrates for catalytic reactions, and for filtration applications.

BACKGROUND OF THE INVENTION

Cordierite bodies having honeycomb structures are especially suited for but not limited to use as substrates for catalysts for converting automotive exhaust, for example, or as diesel particulate filters or as regenerator cores. Use of cordierite is favorable in these applications because of its good thermal shock resistance. The thermal shock resistance is inversely proportional to the coefficient of thermal expansion (CTE). That is, honeycombs with low thermal expansion have good thermal shock resistance and can survive the wide temperature fluctuations that are encountered in the application.

In some cases, such as for thin-walled honeycomb substrates, it is desirable to decrease the total porosity so as to increase strength. However, this reduction in porosity results in a decrease in percent loading of the washcoats, which contain the catalysts, so that in some cases it becomes necessary to coat the substrate several times in order to build up a washcoat layer of the desired thickness. This multiple coating process adds cost to the final product. It is desirable for cordierite bodies to have a narrow pore size distribution of pores having a diameter of less than about 10 micrometers. The advantage of a narrow pore size distribution is that it enhances washcoat pick-up so that the desired thickness of the washcoat layer can be achieved with a single coating step without requiring a multiple coating process.

Up to now, a body having both low CTE and narrow pore size distribution in the less than 10 micrometer range has not been achieved. For the above reasons, it would be highly desirable and an advancement in the art to have cordierite bodies with both of these properties. The present invention provides such bodies and a method of making them.

SUMMARY OF THE INVENTION

In accordance with one aspect of the invention, there is provided a cordierite body of CTE at 25–800° C. of $\leq 4 \times 10^{-7} C^{-1}$, with at least 85% of its total porosity having a mean pore diameter of 0.5–5.0 micrometers.

In accordance with another aspect of the invention, there is provided a cordierite body of CTE at 25–800° C. of $>4-6\times10^{-7}C^{-1}$, a total porosity of at least 30 vol %, at least 85% of its total porosity having a pore diameter 0.5–5.0μ.

In accordance with another aspect of the invention, there is provided a method of making the above-described cordierite bodies that involves intimately blending the raw materials of talc, an $Al_2O_3$-forming source, and one or more of kaolin, calcined kaolin, and silica, and optionally spinel with vehicle and forming aids into a plastic mixture. The mean particle diameter of the talc is $\leq 3.0$ micrometers, that of the $Al_2O_3$-forming source is $\leq 2.0$ micrometers. The kaolin, if present, is <35 wt % of raw materials when particle diameter is <2.0 micrometers. A green body is formed, which is dried and fired at 1370° C.–1435° C. When the mean particle diameter of talc is <2.0 micrometers, and the $Al_2O_3$-forming source is <20 wt % of raw materials, and dispersible high surface area $Al_2O_3$-forming source having a particle diameter of <0.3 micrometers, is <5.0 wt % of the raw materials, and the mean particle diameter of the kaolin is <2.0 micrometers, the heating rate from 1150° C.–1275° C. is >200° C./hr. When the mean particle diameter of the talc is $\geq 2.0$ micrometers, and the $Al_2O_3$-forming source is <20 wt % of the raw materials, and dispersible high surface area $Al_2O_3$-forming source having a mean particle diameter of <0.3 micrometers is <5.0 wt % of the raw materials, and the mean particle diameter of the kaolin is <2.0 micrometers, the heating rate from 1150° C.–1275° C. is >50° C./hr and <600° C./hr. When the $Al_2O_3$-forming source is les than 20 wt % of the raw materials, and dispersible $Al_2O_3$-forming source having particle diameter of <0.3 micrometers is $\geq 5.0$ wt % of the raw materials, and the mean particle diameter of the kaolin is <2.0 micrometers, the heating rate from 1150° C.–1275° C. is >50° C./hr. When the mean particle diameter of the kaolin is >2.0 micrometers, the heating rate from 1150° C.–1275° C. is <600° C./hr and >30° C./hr.

DETAILED DESCRIPTION OF THE INVENTION

This invention relates to cordierite bodies having a unique combination of low thermal expansion or CTE measured at 25–800° C., and narrow pore size distribution. The bodies are made by a process that involves selection of specific combinations of raw materials and firing conditions. According to this invention, CTEs are the mean expansions from 25–800° C. measured by dilatometry. In honeycombs it is the mean expansion along the direction parallel to the length of the open channels.

Unless otherwise specified particle size is expressed as mean particle diameter. Particle size is measured by a sedimentation technique.

Porosity is total porosity measured by mercury porosimetry and is expressed as volume percent.

The Raw Materials

The success of the present invention in obtaining low CTE and very narrow pore size distributions between 0.5 and 5.0 micrometers is based upon the use of fine talc in combination with certain raw materials and firing schedules to maintain low CTE. The use of fine talc enables the attainment of very high fractions of porosity between 0.5 and 5.0 micrometers. However, finer talcs have a tendency to result in a body with a higher CTE due to reduced microcracking. To restore CTEs to desirable low values, the other raw materials must be selectively chosen and, for some raw material combinations, certain restrictions must be placed upon the heating rates during firing.

To achieve the cordierite composition of about 49% to 53% $SiO_2$, about 12% to 16% MgO, and about 33% to 38% $Al_2O_3$ of low thermal expansion and narrow pore size distribution, the raw materials that are utilized are talc, an $Al_2O_3$-forming source, one or more of the components of kaolin, calcined kaolin, and silica. Optionally, spinel can be a raw material.

The talc must have a mean particle diameter of no greater than 3.0 micrometers.

By $Al_2O_3$-forming source is meant $Al_2O_3$ itself or other material having low water solubility which when fired converts to $Al_2O_3$. Some typical $Al_2O_3$-forming components include alumina, $Al(OH)_3$ (also known as aluminum trihydrate or the mineral gibbsite), or aluminum oxide hydroxide (also known as aluminum monohydrate or the mineral boehmite or pseudo-boehmite).

Dispersible high surface area $Al_2O_3$-forming component or source can be provided as the powder or as a sol. By dispersible is meant that the agglomerates of very fine particles can be broken up and dispersed into the constituent particles having a mean particle diameter of less than about 0.3 micrometers. By high surface area is meant a surface area greater than about 10 $m^2/g$ and preferably greater than about 4 $m^2/g$. Such powders can include boehmite, pscudobochmitc, gamma-phase alumina, delta-phase alumina, or other so-called transition aluminas.

The $Al_2O_3$-forming source must have a mean particle diameter of no greater than 2.0 micrometers, and preferably a specific surface area greater than about 5 $m^2/g$. It is preferred that the amount of $Al_2O_3$-forming source be at least about 20% by weight of the raw materials to allow the broadest range in heating rates and still obtain low CTE bodies.

The mean particle diameter of the kaolin, if present, can range between about 0.2 and 10 micrometers. However, if the mean particle size is less than about 2 micrometers, the amount of such kaolin used must be less than about 35 wt. % of the total raw material charge. The balance of the $Al_2O_3$ required to form cordierite is supplied by calcined kaolin or an $Al_2O_3$-forming source, and the balance of the $SiO_2$ being supplied by calcined kaolin or silica powder. It is preferred that the amount of $Al_2O_3$-forming source provided as a dispersible high surface area $Al_2O_3$-forming component be not less than about 5% by weight of the raw material charge.

The raw materials are blended with vehicle and forming aids that impart plastic formability and green strength to the raw materials when they are shaped into a body. When the forming is done by extrusion, the extrusion aids are most typically cellulose ether organic binder, and a lubricant such as sodium ammonium or diglycol stearate, although the invention is not limited to these.

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxycthylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred components of cellulose ethers are Methocel A4M, F4M, F240, and K75M from Dow Chemical Co. Methocel A4M is a methylcellulose, while Methocel F4M, F240, and K75M are hydroxypropyl methylcellulose.

The organic binder content is typically is about 3% to 6%, based on the raw material.

The vehicle can be inorganic, i.e. consisting largely of water, which is typically but not exclusively about 28% to 46%; or it can be organic. The use of water is preferred, although evaporable organic liquids such as lower alkanols can be wholly or partly substituted as desired.

The weight percents of the organic binder, vehicle and other additives are calculated as superadditions with respect to the raw materials.

The mixture is then formed into a green body. The preferred forming method is by extrusion through a die. Extrusion can be done by using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The bodies according to the present invention can have any convenient size and shape. However, the process is especially suited to production of cellular monolith bodies such as honeycombs. Cellular bodies find use in a number of applications such as catalyst carriers, filters such as diesel particulate filters, molten metal filters, regenerator cores, etc.

Generally honeycomb cell densities range from 235 cells/$cm^2$ (about 1500 cells/$in^2$) to 15 cells/$cm^2$ (about 100 cells/$in^2$). Wall (web) thicknesses range typically from about 0.07 to about 0.6 mm (about 3 to about 25 mils). The external size and shape of the body is controlled by the application, e.g. in automotive applications by engine size and space available for mounting, etc. This invention is especially advantageous for honeycombs having very thin walls, e.g. $\leq 0.13$ mm (5 mils). Thinner walled honeycombs can be made e.g. 0.025–0.1 mm (1–4 mils) for some of the inventive mixtures especially those that contain clay, alumina, and a talc all of which have a mean particle size of <3 micrometers in diameter.

The green body is then dried according to conventional procedures for green cordicrite bodies such as e.g. oven or dielectric drying.

The dried body is then fired at a temperature of about 1370° C. to 1435° C. Depending on the raw material combination, the firing conditions will vary.

For example, when the mean particle diameter of the talc is less than about 2.0 micrometers, and the amount of the $Al_2O_3$-forming source is less than about 20% by weight of the raw materials, and dispersible high surface area $Al_2O_3$-forming source having a mean particle diameter of less than about 0.3 micrometers, if present, constitutes less than about 5.0% by weight of the raw materials, and the mean particle diameter of the kaolin is less than about 2.0 micrometers, the heating rate between 1150° C. and 1275° C. is greater than about 200° C./hr to yield the microstructure required for microcracking and low CTE.

When the mean particle diameter of the talc is not less than about 2.0 micrometers, and the amount of $Al_2O_3$-forming source is less than about 20% by weight of the raw materials, and dispersible high surface area $Al_2O_3$-forming source having a mean particle diameter of less than about 0.3 micrometers, if present, constitutes less than about 5.0% by weight of the raw materials, and the mean particle diameter of the kaolin is less than about 2.0 micrometers, the heating rate between 1150° C. and 1275° C. is greater than about 50° C./hr and is less than about 600° C./hr.

When the amount of $Al_2O_3$-forming source is less than about 20% by weight of the raw materials, and dispersible high surface area $Al_2O_3$-forming source having a mean particle diameter of less than about 0.3 micrometers is present in an amount not less than about 5.0% by weight of the raw materials, and the mean particle diameter of the kaolin is less than about 2.0 micrometers, the heating rate between 1150° C. and 1275° C. is greater than about 50° C./hr.

When the mean particle diameter of the kaolin is greater than about 2.0 micrometers, the heating rate between 1150° C. and 1275° C. is less than about 600° C./hr and greater than about 30° C./hr.

The fired body is then cooled to room temperature in as short a time as is practical.

The cordierite bodies of the present invention are characterized by either (1) a mean coefficient of thermal expansion at 25–800° C. of $\leq 4\times 10^{-7}C^{-1}$; or (2) a mean coefficient of thermal expansion of $>4\times 10^{-7}C^{-1}$ but $\leq 6\times 10^{-7}C^{-1}$, and a total porosity not less than about 30% by volume. When the CTE is less than $4\times 10^{-7}C^{-1}$ the total porosity can have any value but is preferably greater than about 18%. In all cases, at least about 85% of the total porosity lies between about 0.5 micrometers and 5.0 micrometers.

The porous microcracked bodies of the present invention find use as catalytic substrates because the pore size distribution is advantageous for picking up and holding a washcoat. The methods of the present invention are especially suitable for manufacture of thin-walled 0.152 mm (<0.006 inches) and ultra thin walled 0.102 mm (<0.004 inches) honeycomb bodies of high cell density. Additionally, the porosities and pore size distributions of bodies prepared by the inventive methods are much less sensitive to changes in heating rates during firing than for bodies prepared by conventional methods involving use of coarser talcs. It is believed that these properties should result in less variability in washcoat loading for substrates fired in various locations within a kiln. The narrow pore size distribution can also be useful in certain filtration applications.

To more fully illustrate the invention, the following non-limiting examples are presented. All parts, portions, and percentages are on a weight basis unless otherwise stated.

In all of the following inventive and comparative examples, raw materials were dry blended together with about 3–6% methylcellulose binder and 0.5–1.0% sodium stearate lubricant, and then mixed with about 30–46% water in a stainless steel muller for about 20 minutes. The resulting plasticized mixture was subsequently extruded as a honeycomb body having about 62 cells/cm² (about 400 cells/in²) and wall thicknesses of about 0.152 mm (about 0.006 inches). The extrudates were wrapped in aluminum foil and dried at about 85° C. for about 72 hours. Honeycombs were cut to about 10.16 cm (4 inch) lengths and placed on coarse alumina sand on an alumina or cordierite pallet in an electric kiln.

Raw material combinations are listed in Table 1. Mean particle sizes were measured by Sedigraph analysis. Firing schedules and physical properties of the fired ware are provided in Table 2.

Examples 1–3 show that the combination of 1.6 micrometer talc, 0.4 micrometer alpha alumina, and 4.5 micrometer crystalline silica yield inventive bodies with low CTE, high total porosity, and more than 85% of the total porosity having a pore size between 0.5 and 5.0 micrometers when fired at a wide range of heating rates.

Comparative examples 4–6 demonstrate that when the mean particle size of the talc is increased to 6.1 micrometers, in combination with 0.4 micrometer alpha-alumina and 4.5 micrometer crystalline silica, the median pore size increases and the pore size distribution becomes much broader, so that the amount of porosity between 0.5 and 5.0 micrometers is less than 85% of the total porosity.

Inventive examples 7 and 8 show that a mixture of fine talc having a mean particle size of 1.6 micrometers in combination with a fine kaolin, fine alumina, and calcined kaolin yields CTEs between 4 and $6\times 10^{-7\circ}$ C.$^{-1}$ with total porosities greater than 30% and very narrow pore size distributions such that more than 85% of the total porosity lies between 0.5 and 5.0 micrometers when heated from 1150° C. to 1275° C. at a rate between 250 and 600° C./hr. Examples 9 to 11 illustrate that this combination of raw materials yields CTEs less than $4\times 10^{-7\circ}$ C.$^{-1}$ with greater than 85% of the total porosity lying between 0.5 and 5.0 micrometers when heated at more than 600° C./hr between 1150 and 1275° C. Comparative examples 12 to 14 show that when bodies comprised of these raw materials are heated at less than 250° C./hr, CTEs exceed $6\times 10^{-7\circ}$ C.$^{-1}$ and are therefore non-inventive.

Inventive examples 15 and 16 demonstrate that a fine talc having a mean particle size of about 2.2 micrometers can be used in combination with a fine kaolin, calcined kaolin, and fine alumina when the 1150–1275° C. heating rate is greater than about 50° C./hr but less than about 600° C./hr. Comparative example 17 shows that the CTE is greater than $6\times 10^{-7\circ}$ C.$^{-1}$ when the heating rate is less than 50° C./hr from 1150–1275° C. Comparative examples 18 and 19 illustrate that when the heating rate between 1150 and 1275° C. is faster than about 500° C./hr, the porosity is excessively coarsened, and the percent of total porosity between 0.5 and 5.0 micrometers is less than 85%.

Comparative examples 20 and 21 demonstrate than when a 3.4 micrometer talc is used in combination with fine kaolin, fine alumina, and calcined kaolin, the mean pore size is coarsened so that the porosity between 0.5 and 5.0 micrometers is less than 85% of the total porosity.

Comparative example 22 shows that when a 4.2 micrometer talc is used in combination with fine kaolin, fine alumina, and calcined kaolin and is fired at a heating rate slower than 150° C./hr between 1150 and 1275° C., a narrow pore size distribution is obtained, but the CTE is increased to more than $6\times 10^{-7\circ}$ C.$^{-1}$. Comparative examples 23 and 24 show that when this raw material combination is fired at greater than 150° C./hr between 1150 and 1275° C. so as to maintain a CTE less than $6\times 10^{-7\circ}$ C.$^{-1}$, the mean pore size is coarsened so that the percent of total porosity between 0.5 and 5.0 micrometers is less than 85%.

Examples 25–30 demonstrate that the partial replacement of 0.4 micrometer alpha-alumina with at least 5% boehmite having a surface area of about 180 m²/g and a fine dispersed particle size of about 0.125 micrometers, in combination with a 1.6 micrometer talc, a 0.9 micrometer kaolin, and calcined kaolin, yields bodies having a CTE less than $4\times 10^{-7\circ}$ C.$^{-1}$, and a porosity between 0.5 and 5.0 micrometers that is more than 85% of the total porosity when such bodies are heated at greater than 50° C./hr between 1150 and 1275° C. Thus, the addition of this boehmite to the raw material combination of fine talc, fine kaolin, calcined kaolin, and alpha-alumina allows the use of slower firing rates while maintaining the desired combination of low CTE and narrow pore size distribution.

Inventive examples 31 and 32 demonstrate that low CTE bodies with very narrow pore size distributions and total porosities not less than 30% are obtained for raw material combinations of 1.6 micrometer talc and a coarser 7.4 micrometer kaolin with 0.4 micrometer alpha alumina when fired at a heating rate between 1150 and 1275° C. of greater than about 30° C./hr but less than about 600° C./hr. The ability to use fine talc with coarse kaolin and still obtain a low CTE is unexpected. Comparative example 33 illustrates that CTEs become greater than $6\times 10^{-7\circ}$ C.$^{-1}$ when the heating rate is less than about 30° C./hr between 1150 and 1275° C. Comparative examples 34 and 35 show that when heating rates exceed about 600° C./hr, the mean pore size is coarsened so that the porosity between 0.5 and 5.0 micrometers is no longer at least 85% of the total porosity.

Comparative examples 36–38 demonstrate that the use of a coarse 4.5 micrometer alpha-alumina powder in combination with fine talc, fine kaolin, and calcined kaolin results in a CTE greater than $6\times 10^{-7\circ}$ C.$^{-1}$ for either slow or fast heating rates.

It should be understood that while the present invention has been described in detail with respect to certain illustrative and specific embodiments thereof, it should not be considered limited to such but may be used in other ways without departing from the spirit of the invention and the scope of the appended claims.

TABLE 1

Weight percentages and mean particle sizes of raw materials used in examples.
BATCH COMPOSITION IN WEIGHT PERCENT
(mean particle size measured by sedimentation technique, in micrometers, given in parentheses)

| Composition Number | Talc | Kaolin | Calcined Kaolin | Alpha-Alumina | Quartz | Dispersible AlOOH-xH$_2$O 180 m$^2$/g |
|---|---|---|---|---|---|---|
| 1 | 42.4(1.6) | | | | 34.2 (0.4) | 23.5 (4.5) |
| 2 | 42.4 (6.1) | | | | 34.2 (0.4) | 23.5 (4.5) |
| 3 | 40.9 (1.6) | 12.8 (0.9) | 32.6 (1.6) | | 13.7 (0.4) | |
| 4 | 40.9 (2.2) | 12.8 (0.9) | 32.6 (1.6) | | 13.7 (0.4) | |
| 5 | 40.9 (3.4) | 12.8 (0.9) | 32.6 (1.6) | | 13.7 (0.4) | |
| 6 | 40.9 (4.2) | 12.8 (0.9) | 32.6 (1.6) | | 13.7 (0.4) | |
| 7 | 40.9 (1.6) | 14.3 (0.9) | 29.6 (1.6) | | 8.2 (0.4) | 7.0 (0.125) |
| 8 | 40.6 (1.6) | 14.2 (0.9) | 29.4 (1.6) | | 5.5 (0.4) | 10.4 (0.125) |
| 9 | 40.3 (1.6) | 14.1 (0.9) | 29.2 (1.6) | | 2.7 (0.4) | 13.7 (0.125) |
| 10 | 39.6 (1.6) | 47.1 (7.4) | | | 13.3 (0.4) | |
| 11 | 40.9 (1.6) | 12.8 (0.9) | 32.6 (1.6) | | 13.7 (4.5) | |

TABLE 2

Firing schedules and properties of examples.

| Example Number | Composition Number | Example Type | Heating rate 1150–1275° C. (°C./hr) | Heating rate 1275–1400° C. (°C./hr) | Maximum Temperature (°C.) | Soak Time at Maximum Temperature (hrs) | Mean CTE (10$^{-7}$° C.$^{-1}$) (25–800° C.) | Vol % Porosity | Total Pore Volume (cm$^3$/g) | Median Pore Diameter (μm) | % of Total Porosity between 0.5 and 5.0 μm | % of Total Porosity Greater than 10 μm |
|---|---|---|---|---|---|---|---|---|---|---|---|---|
| 1 | 1 | Inventive | 25 | 25 | 1410 | 8 | 3.3 | 34.8 | 0.2161 | 1.5 | 89.2 | 6.1 |
| 2 | 1 | Inventive | 50 | 50 | 1410 | 8 | 2.8 | 35.3 | 0.2205 | 1.5 | 88.6 | 7.1 |
| 3 | 1 | Inventive | 200 | 200 | 1410 | 12 | 1.9 | 31.2 | 0.1924 | 2.5 | 90.0 | 6.5 |
| 4 | 1 | Comparative | 25 | 25 | 1410 | 8 | 2.9 | 31.4 | 0.1858 | 4.1 | 63.2 | 11.7 |
| 5 | 2 | Comparative | 50 | 50 | 1410 | 8 | 5.1 | 30.8 | 0.1793 | 4.9 | 51.0 | 16.7 |
| 6 | 2 | Comparative | 625 | 200 | 1410 | 12 | 6.2 | 24.8 | 0.1327 | 9.7 | 1.1 | 44.5 |
| 7 | 3 | Inventive | 500 | 200 | 1410 | 1.7 | 5.6 | 30.1 | 0.1721 | 2.0 | 96.8 | 2.2 |
| 8 | 3 | Inventive | 600 | 200 | 1410 | 1.7 | 5.9 | 31.8 | 0.1885 | 3.1 | 90.8 | 2.1 |
| 9 | 3 | Inventive | 625 | 625 | 1414 | 5 | 3.6 | 29.6 | 0.1693 | 2.8 | 89.5 | 6.8 |
| 10 | 3 | Inventive | 1200 | 50 | 1410 | 2.5 | 2.8 | 26.1 | 0.1447 | 2.7 | 87.6 | 9.5 |
| 11 | 3 | Inventive | 1200 | 200 | 1410 | 1.7 | 3.9 | 22.8 | 0.1692 | 1.7 | 92.1 | 2.5 |
| 12 | 3 | Comparative | 25 | 25 | 1410 | 8 | 8.0 | 32.0 | 0.1932 | 1.7 | 95.8 | 3.5 |
| 13 | 3 | Comparative | 50 | 50 | 1410 | 8. | 6.3 | 32.7 | 0.1976 | 1.9 | 89.9 | 6.2 |
| 14 | 3 | Comparative | 200 | 200 | 1410 | 12 | 6.3 | 33.6 | 0.1993 | 2.3 | 96.7 | 2.2 |
| 15 | 4 | Inventive | 200 | 200 | 1410 | 12 | 5.8 | 32.1 | 0.1956 | 2.7 | 93.1 | 3.4 |
| 16 | 4 | Inventive | 500 | 200 | 1410 | 1.7 | 5.6 | 30.6 | 0.1756 | 3.0 | 87.4 | 5.6 |
| 17 | 4 | Comparative | 25 | 25 | 1410 | 8 | 8.0 | 30.9 | 0.1849 | 1.9 | 96.0 | 2.9 |
| 18 | 4 | Comparative | 625 | 625 | 1414 | 5 | 4.5 | 30.2 | 0.1734 | 3.9 | 72.2 | 10.0 |
| 19 | 4 | Comparative | 1200 | 200 | 1410 | 1.7 | 4.8 | 23.5 | 0.1254 | 4.3 | 64.5 | 11.2 |
| 20 | 5 | Comparative | 50 | 50 | 1414 | 8 | 4.2 | 26.6 | 0.1478 | 3.6 | 56.5 | 19.0 |
| 21 | 5 | Comparative | 625 | 625 | 1414 | 5 | 5.8 | 29.4 | 0.1677 | 4.1 | 70.7 | 10.3 |
| 22 | 6 | Comparative | 50 | 50 | 1414 | 8 | 7.3 | 34.2 | 0.2106 | 1.6 | 95.4 | 4.1 |
| 23 | 6 | Comparative | 200 | 200 | 1410 | 12 | 5.8 | 25.2 | 0.1404 | 4.8 | 48.4 | 17.8 |
| 24 | 6 | Comparative | 625 | 625 | 1414 | 5 | 5.3 | 24.6 | 0.1307 | 7.4 | 9.6 | 30.5 |
| 25 | 7 | Inventive | 250 | 200 | 1410 | 1.7 | 3.9 | 26.5 | 0.1465 | 1.8 | 88.5 | 10.9 |
| 26 | 7 | Comparative | 40 | 25 | 1405 | 8 | 5.4 | 28.5 | 0.1587 | 1.3 | 83,9 | 13.4 |
| 27 | 8 | Inventive | 250 | 200 | 1410 | 1.7 | 2.0 | 22.3 | 0.1138 | 1.6 | 92.6 | 4.0 |
| 28 | 8 | Comparative | 40 | 25 | 1405 | 8 | 4.7 | 25.0 | 0.1332 | 1.2 | 86.6 | 9.6 |
| 29 | 9 | Inventive | 250 | 200 | 1410 | 1.7 | 0.4 | 20.7 | 0.1037 | 1.6 | 91.2 | 6.6 |
| 30 | 9 | Comparative | 40 | 25 | 1405 | 8 | 3.8 | 26.3 | 0.1431 | 1.1 | 74.2 | 22.0 |
| 31 | 10 | Inventive | 50 | 50 | 1410 | 8 | 5.8 | 30.6 | 0.1794 | 1.8 | 96.7 | 1.7 |
| 32 | 10 | Inventive | 200 | 200 | 1410 | 12 | 3.2 | 30.0 | 0.1764 | 3.2 | 88.5 | 6.2 |
| 33 | 10 | Comparative | 25 | 25 | 1410 | 8 | 7.1 | 31.4 | 0.1849 | 1.8 | 94.6 | 4.1 |
| 34 | 10 | Comparative | 625 | 625 | 1410 | 5 | 3.6 | 23.1 | 0.1245 | 4.6 | 61.0 | 5.1 |
| 35 | 10 | Comparative | 1200 | 200 | 1410 | 1.7 | 3.1 | 26.8 | 0.1425 | 4.0 | 66.7 | 6.1 |
| 36 | 11 | Comparative | 25 | 25 | 1410 | 8 | 10.3 | 38.0 | 0.2481 | 2.3 | 91.5 | 7.5 |
| 37 | 11 | Comparative | 50 | 50 | 1410 | 8 | 8.6 | 36.4 | 0.2327 | 2.4 | 92.0 | 6.6 |
| 38 | 11 | Comparative | 625 | 200 | 1410 | 12 | 8.2 | 33.8 | 0.2081 | 4.3 | 70.8 | 6.0 |

What is claimed is:

1. A method of producing a cordierite body, the method comprising:
   a) selecting cordierite-forming raw materials comprising talc, an Al$_2$O$_3$-forming source, and one or more of the components of kaolin, calcined kaolin, and silica, with optional additions of spinel, wherein the mean particle diameter of the talc is not greater than about 3.0 micrometers, and the mean particle diameter of the Al$_2$O$_3$-forming source is not greater than about 2.0 micrometers, and the amount of kaolin, if present, is less than about 35% by weight of the raw materials when the mean particle diameter of the kaolin is less than about 2.0 micrometers;

b) intimately blending the raw materials with an effective amount of vehicle and forming aids to impart plastic formability and green strength to the raw materials and form a plastic mixture therefrom;

c) forming said raw materials into a green body;

d) drying the green body; and e) firing said green body at temperature of about 1370° C. to 1435° C., wherein when the mean particle diameter of the talc is less than about 2.0 micrometers, and the amount of the $Al_2O_3$-forming source is less than about 20% by weight of the raw materials, and dispersible high surface area $Al_2O_3$-forming source having a mean particle diameter of less than about 0.3 micrometers, if present, constitutes less than about 5.0% by weight of the raw materials, and the mean particle diameter of the kaolin is less than about 2.0 micrometers, the heating rate between 1150° C. and 1275° C. is greater than about 200° C./hr, wherein when the mean particle diameter of the talc is not less than about 2.0 micrometers, and the amount of $Al_2O_3$-forming source is less than about 20% by weight of the raw materials, and dispersible high surface area $Al_2O_3$-forming source having a mean particle diameter of less than about 0.3 micrometers, if present, constitutes less than about 5.0% by weight of the raw materials, and the mean particle diameter of the kaolin is less than about 2.0 micrometers, the heating rate between 1150° C. and 1275° C. is greater than about 50° C./hr and less than about 600° C./hr, wherein when the amount of $Al_2O_3$-forming source is less than about 20% by weight of the raw materials, and dispersible $Al_2O_3$-forming source having a mean particle diameter of less than about 0.3 micrometers constitutes not less than about 5.0% by weight of the raw materials, and the mean particle diameter of the kaolin is less than about 2.0 micrometers, the heating rate between 1150° C. and 1275° C. is greater than about 50° C./hr, and wherein when the mean particle diameter of the kaolin is greater than about 2.0 micrometers, the heating rate between 1150° C. and 1275° C. is less than about 600° C./hr and greater than about 30° C./hr, to produce a body having a composition consisting essentially of in weight percent about 49% to 53% $SiO_2$, 33% to 38% $Al_2O_3$, and 12% to 16% MgO and having one of the following sets of properties: a mean coefficient of thermal expansion at 25–800° C. of $\leq 4 \times 10^{-7}$ $C.^{-1}$, and a porosity wherein not less than about 85% of the total porosity has a pore diameter between about 0.5 micrometers and 5.0 micrometers, or a mean coefficient of thermal expansion at 25–800° C. of $>4 \times 10^{-7}$ $C.^{-1}$, but $\leq 6 \times 10^{-7}$ $C.^{-1}$, a total porosity of not less than about 30% by volume, wherein not less than about 85% of the total porosity has a pore diameter of between about 0.5 micrometers and 5.0 micrometers.

2. A method of claim 1 wherein the amount of $Al_2O_3$-forming source is at least about 20% by weight of the raw materials.

3. A method of claim 1 wherein kaolin is present as a raw material and has a mean particle diameter of no greater than about 2.0 micrometers, and wherein the amount of $Al_2O_3$-forming source is no greater than about 20% by weight of the raw materials.

4. A method of claim 3 wherein the amount of dispersible high surface area $Al_2O_3$-forming source is not less than about 5.0% by weight of the raw materials.

5. A method of claim 4 wherein the dispersible high surface area $Al_2O_3$-forming source is selected from the group consisting of boehmite, pseudoboehmite, and combinations thereof.

6. A cordierite body having a mean coefficient of thermal expansion at 25–800° C. of $\leq 4 \times 10^{-7} C^{-1}$ and a porosity wherein not less than about 85% of the total porosity has a pore diameter between about 0.5 micrometers and 5.0 micrometers.

7. A cordierite body having a mean coefficient of thermal expansion of $>4 \times 10^{-7} C^{-1}$ but $<6 \times 10^{-7} C^{-1}$, a total porosity not less than about 30% by volume, wherein not less than about 85% of the total porosity has a pore diameter between about 0.5 micrometers and 5.0 micrometers.

* * * * *

UNITED STATES PATENT AND TRADEMARK OFFICE
Certificate

Patent No. 6,087,281                                                                                  Patented: July 11, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of the patent is: Gregory A. Merkel and Douglas M. Beall.

Signed and Sealed this Sixth Day of March, 2001.

<div style="text-align:right">

MARK BELL
*Superviosry Patent Examiner*
Art Unit 1755

</div>

UNITED STATES PATENT AND TRADEMARK OFFICE
CERTIFICATE OF CORRECTION

PATENT NO. : 6,087,281
DATED : July 11, 2000
INVENTOR(S) : Merkel et al.

It is certified that error appears in the above-identified patent and that said Letters Patent is hereby corrected as shown below:

Title page, item [57],
Abstract,
Line 7, "<2.0µ" should be -- $\leq 2.0\mu$ --
Line 22, "<0.3µis" should be -- $<0.3\mu$ is --.

Column 2,
Line 19, "les" should be -- less --.

Column 3,
Line 13, "pscudobochmitc" should be -- pseudoboehmite --.
Line 48, "hydroxycthylcellulose" should be -- hydroxyethylcellulose --.

Column 4,
Line 29, "cordicrite" should be -- cordierite --.

Column 6,
Line 38, "boehmitc" should be -- boehmite --.

Column 7,
Table 2, example 2, "Composition Number 1" should be -- Composition Number 2 --.

Claims,
Column 7, claim 1,
Line 66, "cordicrite" should be -- cordierite --.

Column 10, claim 7,
Line 40, "<6x10$^{-7}$C$^{-1}$" should be -- $\leq 6 \times 10^{-7} C^{-1}$ --.

Signed and Sealed this

Thirtieth Day of October, 2001

*Attest:*

*Attesting Officer*

NICHOLAS P. GODICI
*Acting Director of the United States Patent and Trademark Office*